United States Patent
Primus et al.

(10) Patent No.: US 10,119,460 B2
(45) Date of Patent: Nov. 6, 2018

(54) INTEGRATED TURBOSHAFT ENGINE

(71) Applicant: General Electric Company, Schenectady, NY (US)

(72) Inventors: Roy James Primus, Niskayuna, NY (US); Adam Edgar Klingbeil, Ballston Lake, NY (US); Narendra Digamber Joshi, Schenectady, NY (US); Omowoleola Chukwuemeka Akinyemi, Clifton Park, NY (US); Thomas Michael Lavertu, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 758 days.

(21) Appl. No.: 14/489,565

(22) Filed: Sep. 18, 2014

(65) Prior Publication Data
US 2016/0319742 A1 Nov. 3, 2016

(51) Int. Cl.
*F02C 3/13* (2006.01)
*F02B 63/04* (2006.01)
(Continued)

(52) U.S. Cl.
CPC ............ *F02B 63/04* (2013.01); *F01D 15/10* (2013.01); *F02C 3/10* (2013.01); *F02C 3/13* (2013.01); *F02C 6/00* (2013.01); *F02C 6/08* (2013.01); *F02C 6/12* (2013.01); *F02C 6/20* (2013.01); *F02D 41/0007* (2013.01);
(Continued)

(58) Field of Classification Search
CPC .... F02C 6/08; F02C 6/12; F02C 7/143; F02C 9/18; F02C 3/10; F02C 3/13; F05D 2220/40
See application file for complete search history.

(56) References Cited

U.S. PATENT DOCUMENTS 2,418,911 A * 4/1947 Smith ............... F02C 3/055
60/39.17
2,970,433 A 2/1961 Johann
(Continued)

FOREIGN PATENT DOCUMENTS

GB 1514614 A 6/1978
GB 1518098 A 7/1978
(Continued)

*Primary Examiner* — Steven Sutherland
(74) *Attorney, Agent, or Firm* — GE Global Patent Operation; Nitin Joshi

(57) ABSTRACT

A system includes an engine coupled with a primary shaft that drives a first electric generator for generating electrical power via a gear subsystem. The system also includes a turbocharger assembly having at least one gas turbine engine configured for driving the primary shaft and coupled in parallel with the engine. The turbocharger assembly includes multiple compressors configured to provide a flow of compressed fluid into both the engine and the at least one gas turbine engine and multiple turbines configured to utilize exhausts from both the engine and the one gas turbine for driving the primary shaft. Further, the system includes a controller configured to operate a plurality of valves for controlling optimal intake fluid pressure into the engine and the turbocharger assembly and fuel injections into the engine and the at least one gas turbine engine.

5 Claims, 3 Drawing Sheets

Figure 1:
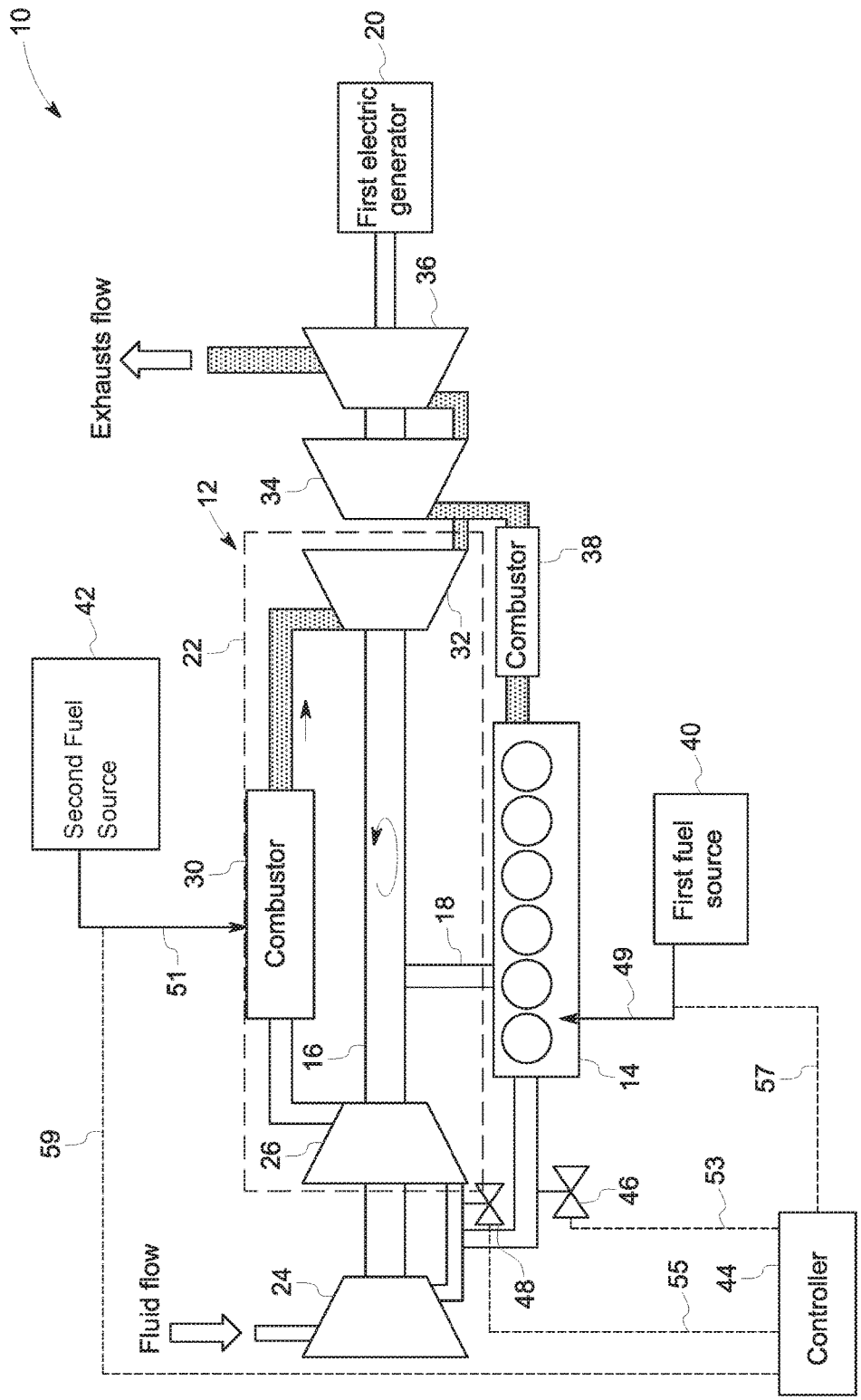

(51) Int. Cl.
*F02C 3/10* (2006.01)
*F02D 41/00* (2006.01)
*F02C 6/08* (2006.01)
*F02C 6/00* (2006.01)
*F02C 6/12* (2006.01)
*F02C 6/20* (2006.01)
*F01D 15/10* (2006.01)

(52) U.S. Cl.
CPC ...... *F05D 2220/40* (2013.01); *F05D 2220/76* (2013.01); *Y02T 10/144* (2013.01)

(56) References Cited

U.S. PATENT DOCUMENTS

| | | | |
|---|---|---|---|
| 3,577,729 A | 5/1971 | Warren | |
| 4,138,980 A | 2/1979 | Ward | |
| 4,873,825 A | 10/1989 | Rees | |
| 5,724,806 A * | 3/1998 | Horner | F02C 7/12 60/728 |
| 7,775,044 B2 | 8/2010 | Julien et al. | |
| 8,051,637 B2 | 11/2011 | Labrador | |
| 2007/0089420 A1* | 4/2007 | Klingels | B64D 13/06 60/772 |
| 2007/0240415 A1* | 10/2007 | Julien | F02C 3/055 60/614 |
| 2010/0146965 A1* | 6/2010 | Easley, Jr. | F02B 37/001 60/602 |
| 2013/0174555 A1* | 7/2013 | Gruber | F02B 37/00 60/698 |
| 2013/0213048 A1* | 8/2013 | Stucki | B64D 27/04 60/772 |

FOREIGN PATENT DOCUMENTS

| | | |
|---|---|---|
| JP | 2009215962 A | 9/2009 |
| WO | 2002070878 A1 | 9/2002 |
| WO | 2013144839 A1 | 10/2013 |

* cited by examiner

INTEGRATED TURBOSHAFT ENGINE

BACKGROUND

The present technology relates generally to engines and, in particular, to systems and methods having an integrated turbo-shaft engine.

The capability of modern engines to produce more power from a given cylinder displacement has been steadily increased due to engineering innovation and development. Modern engines utilize higher charged air pressure provided by turbochargers to generate more power than their previous generation counterparts. The amount of power obtained from an engine depends upon how much fuel is burned in it, and upon the amount of air available in the engine. Therefore, by providing more air into the engine cylinder more fuel can be burned and the power generated can be increased. Turbocharging is a technique used to increase the amount of air introduced into each cylinder, typically by a positive pressure that exceeds the then reigning pressure in the cylinder. Exhaust gas from the engine typically drives the turbocharger. This exhaust gas drives a turbine, which, in turn, drives a compressor to drive the additional air into the cylinder. However, despite using turbochargers, the engines such as piston and rotary engines are low in power density compared to gas turbines.

There is therefore a desire for an improved system and method for operating engines at high power density and high fuel efficiency.

BRIEF DESCRIPTION

In accordance with an example of the present technology, a system includes an engine coupled with a primary shaft that drives a first electric generator for generating electrical power via a gear subsystem. The system also includes a turbocharger assembly including at least one gas turbine engine configured for driving the primary shaft and coupled in parallel with the engine. The turbocharger assembly includes multiple compressors configured to provide a flow of compressed fluid into both the engine and the at least one gas turbine engine. The turbocharger assembly also includes multiple turbines configured to utilize exhausts from both the engine and the at least one gas turbine for driving the primary shaft. Further, the system includes a controller configured to operate multiple valves for controlling optimal intake fluid pressure into the engine and the turbocharger assembly and fuel injections into the engine and the at least one gas turbine engine.

In accordance with an example of the technology, a method of operating an engine includes compressing a flow of fluid via a first compressor and directing a first portion of the compressed fluid into an engine for combustion, and further directing a second portion of the compressed fluid into a primary combustor of a gas turbine via a second compressor. The method also includes directing the exhausts from the primary combustor and the engine through multiple turbines that drive a primary shaft. The primary shaft drives a first electric generator for generating power. Further, the method includes operating both the engine and the gas turbine at maximum power during full load operating conditions and disabling the gas turbine during part load conditions.

In accordance with an example of the technology, a system includes an engine coupled with a primary shaft that drives a first electric generator for generating electrical power. The system also includes a turbocharger assembly having a gas turbine engine configured for driving a secondary shaft that further drives a second electric generator. The turbocharger assembly includes multiple compressors configured to provide a flow of compressed fluid into both the engine and the gas turbine engine. The turbocharger also includes multiple turbines configured to utilize exhausts from both the engine and the at least one gas turbine for driving the secondary shaft. Further, the system includes a controller configured to operate multiple valves for controlling optimal intake fluid pressure into the engine and the turbocharger assembly and fuel injections into the engine and the gas turbine engine.

DRAWINGS

Figure 2:
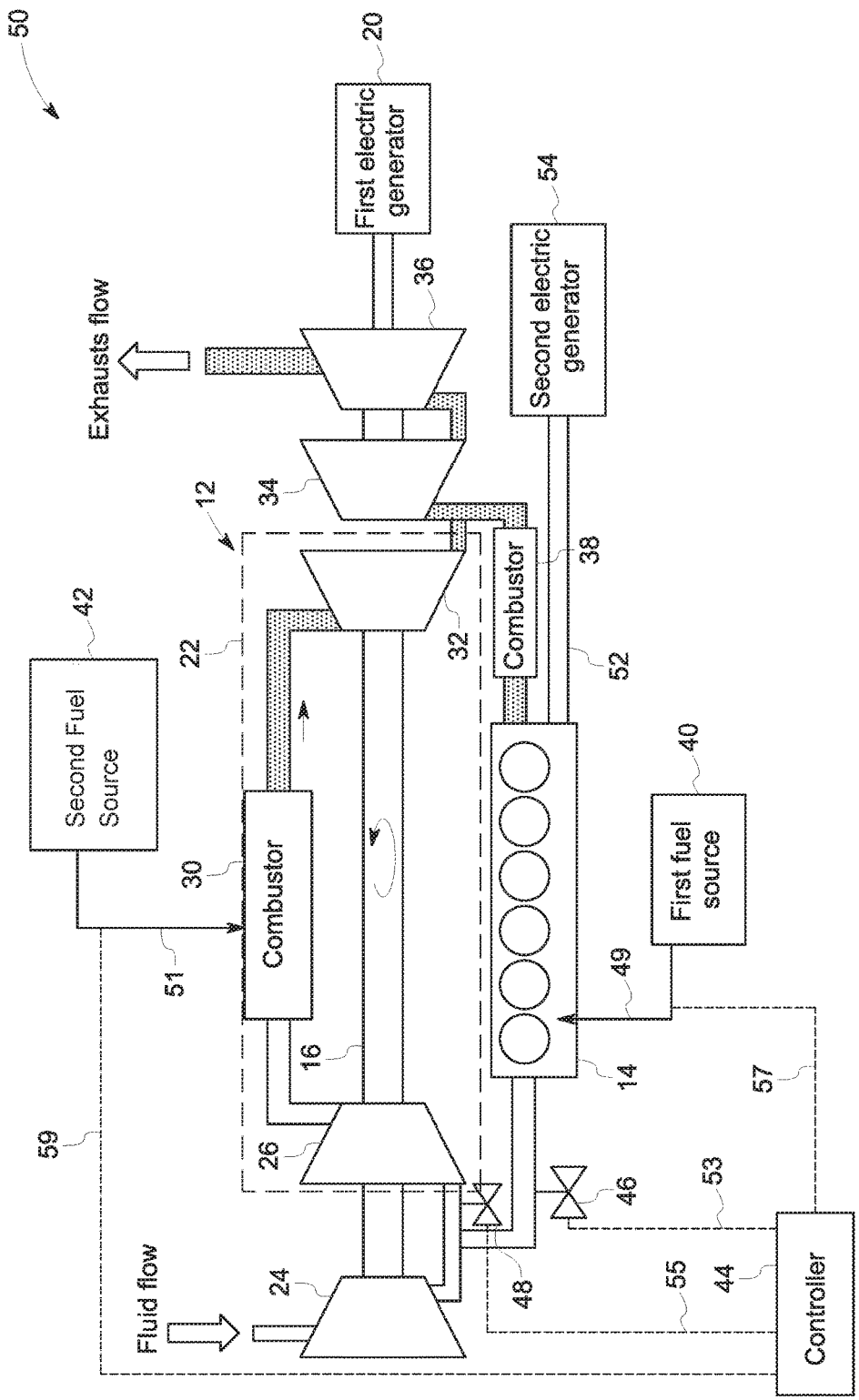
Figure 3:
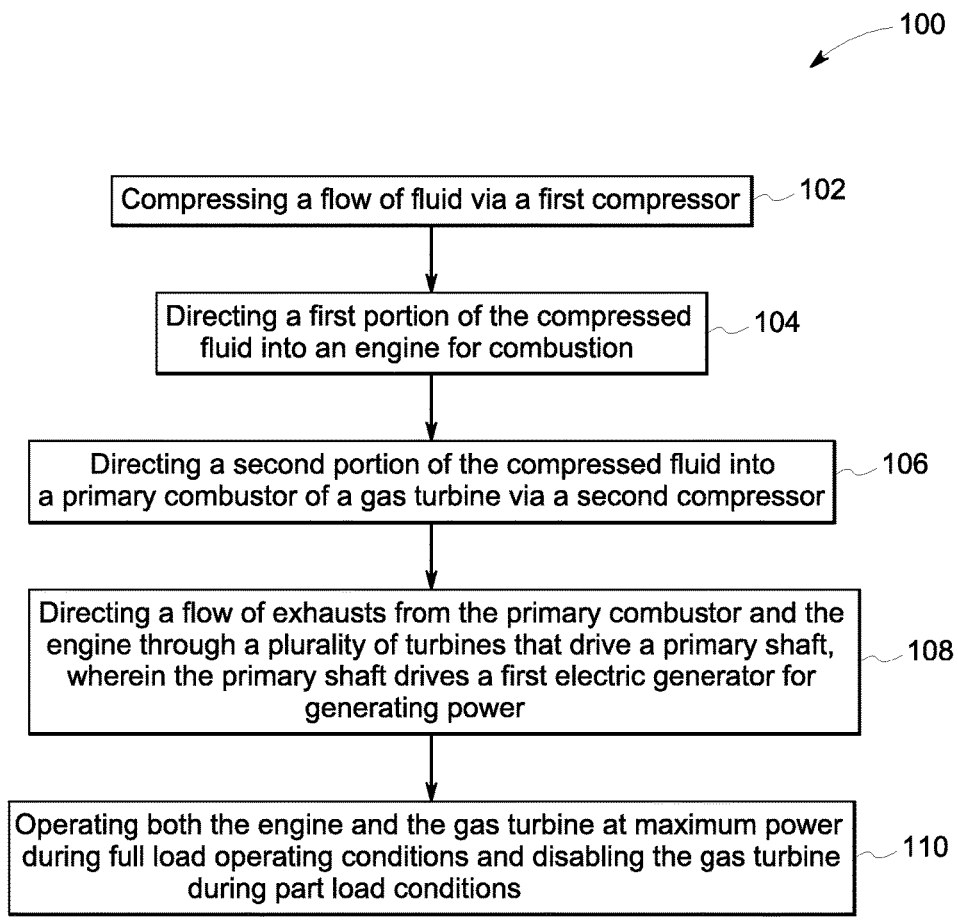

These and other features, aspects, and advantages of the present technology will become better understood when the following detailed description is read with reference to the accompanying drawings in which like characters represent like parts throughout the drawings, wherein:

FIG. 1 schematically shows a system with an integrated turbo-shaft engine and a turbocharger assembly in accordance with an example of the present technology;

FIG. 2 schematically shows a system with an integrated turbo-engine and a turbocharger assembly in accordance with another example of the present technology;

FIG. 3 is a flow chart 100 of a method of controlling an engine in accordance with an example of the present technology.

DETAILED DESCRIPTION

When introducing elements of various embodiments of the present technology, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed examples.

FIG. 1 schematically shows a system 10 having an integrated turbo-shaft engine having a turbocharger assembly 12 in accordance with an example of the present technology. The system 10 includes an engine 14 coupled with a primary shaft 16 via a gear subsystem 18 that drives a first electric generator 20 for generating electrical power. The gear subsystem 18 may include two or more gears that provide transmission of power from the engine 14 to the primary shaft 16. The turbocharger assembly 12 includes a gas turbine engine 22 configured for driving the primary shaft 16 and coupled in parallel with the engine 14. Non-limiting examples of the engine 14 includes piston-based reciprocating engines having multiple cylinders that are two-stroke engines, four-stroke engines, rotary engines such as Wankel engine, or other volume displacement mechanism engines.

Further, the turbocharger assembly 12 includes a first stage compressor 24 and a second stage compressor 26 configured to provide a flow of compressed fluid into both the engine 14 and the gas turbine engine 22. The first compressor 24 compresses fluid and directs a first portion of the compressed fluid to the engine 14 and a second portion of compressed fluid into the second stage compressor 26 for further compression. The second stage compressor 26 directs the compressed fluid into a primary combustor 30 of the gas turbine engine 22. Furthermore, the turbocharger assembly 12 includes a first stage turbine 32, a second stage turbine 34 and a third stage turbine 36. The first stage turbine 32 receives a first flow of exhausts from the primary combustor 30. The second stage turbine 34 receives the first flow of exhausts from the first stage turbine 32 and a second flow of exhausts from the engine 14. The exhausts from the second stage turbine are then directed to the third stage turbine 36.

In one example, the system 10 also includes a secondary combustor 38 located on an exhaust flow line downstream of the engine 14 prior to the second stage turbine 34. The exhausts from the engine 14 are further combusted in the secondary combustor 38 for generating additional power in the system 10. As shown, each of the engine 14 and the primary combustor 30 of the gas turbine 22 are supplied with fuels from a first fuel source 40 and a second fuel source 42 respectively.

The system 10 also includes a controller 44 that operates multiple valves 46, 48 for controlling optimal intake fluid pressure into the engine 14 and the turbocharger assembly 12. Additional valves may also be located in fluid lines prior to compression in the first and second stage compressors for controlling flow of compressed fluid. The controller 44 is also configured to control fuel injections into the engine 14 and the primary combustor 30. As shown, the controller 44 is connected to the multiple valves 46, 48, fuel lines 49, 51 by connector lines 53, 55, 57, 59 respectively. The controller 44 is configured to operate both the engine 14 and the gas turbine 22 at maximum power during full load operation of the system 10. During part load conditions, the controller is configured to operate only the engine 14 and disable the gas turbine 22. This is done so that there is high efficiency throughout the operation of the system 10.

FIG. 2 schematically shows another system 50 in accordance with another example of the present technology. In this example, the engine 14 drives a secondary shaft 52, which secondary shaft 52 is coupled to a second electric generator 54. Additional power, generated by the second electric generator 54, may be used to charge a battery or used to drive traction motors for propelling a vehicle. It is to be noted that neither the engine 14 nor the secondary shaft 52 is coupled or integrated to the primary shaft 16.

FIG. 3 is a flow chart 100 of a method of operating an engine in accordance with an example of the present technology. At step 102, the method includes compressing a flow of fluid via a first compressor. At step, 104, the method includes directing a first portion of the compressed fluid into an engine for combustion. At step 106, the method includes directing a second portion of the compressed fluid into a primary combustor of a gas turbine via a second compressor. Further, at step 108, the method includes directing a flow of exhaust from the primary combustor and the engine through multiple turbines that drive a primary shaft. The primary shaft is configured to drive a first electric generator for generating power. Furthermore, at step 110, the method includes operating both the engine and the gas turbine at maximum power during full load operating conditions and disabling the gas turbine during part load conditions.

Advantageously, the present technology provides a higher power-to-weight engine than is typical of a piston engine together with a high-efficiency. The present technology also enables operation at a relatively high fuel efficiency due to flexible operability of both the gas turbine engine and the piston engine at full load conditions and only the engine during part load conditions. Also, the engine can operate at high altitudes by capitalizing on the numerous stages of compression used in the turbocharger assembly. Further, the present technology has applicability in situations where high efficiency combined with high power-to-weight ratio is critical such as aviation applications. Furthermore, this present technology also provides the power required for takeoff and landing combined with good efficiency to reduce the cost and weight of the fuel required for a mission.

Furthermore, the skilled artisan will recognize the interchangeability of various features from different examples. Similarly, the various methods and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular example. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While only certain features of the technology have been illustrated and described herein, many modifications and changes will occur to those skilled in the art. It is, therefore, to be understood that the appended claims are intended to cover all such modifications and changes as fall within the true spirit of the claimed inventions.

The invention claimed is:

1. A system comprising:
   an engine coupled to a primary shaft via a gear subsystem, the primary shaft driving a first electric generator for generating electrical power;
   a turbocharger assembly comprising at least one gas turbine engine configured for driving the primary shaft and coupled in parallel with the engine; wherein the turbocharger assembly comprises a first stage compressor and a second stage compressor, wherein the first stage compressor compresses fluid and directs a first portion of the compressed fluid to the engine and a second portion of compressed fluid into the second stage compressor for further compression, wherein the second stage compressor directs the second portion of the compressed fluid into a primary combustor of the at least one gas turbine engine; wherein the turbocharger assembly further comprises a first stage turbine and a second stage turbine, wherein the first stage turbine receives a first flow of exhaust from the primary combustor, and wherein the second stage turbine receives the first flow of exhaust from the first stage turbine and a second flow of exhaust from the engine; wherein the turbocharger assembly further comprises a secondary combustor located on an exhaust flow line downstream of the engine prior to the second stage turbine; and
   a controller configured to operate a plurality of valves for controlling intake fluid pressure into the engine and the turbocharger assembly, and the controller is further configured for controlling fuel injection into the engine and the at least one gas turbine engine,
   wherein the controller is configured to operate both the engine and the at least one gas turbine engine at maximum power during full load operation of the system, and
   wherein the controller is configured to operate the engine and disable the at least one gas turbine engine during part load operation of the system.

2. The system of claim 1, wherein the engine is a piston-based reciprocating engine, a rotary engine, or a volume displacement mechanism engine.

3. The system of claim 1 further comprising a third stage turbine configured to receive exhaust from the second stage turbine.

4. The system of claim 1, wherein the controller is configured to operate the at least one gas turbine engine at a reduced power.

5. The system of claim 1, wherein the engine drives a secondary shaft that is coupled to a second electric generator.

\* \* \* \* \*